Patented Oct. 23, 1934

1,977,628

UNITED STATES PATENT OFFICE 1,977,628

PRODUCTION OF FERTILIZERS

William Kenneth Hall, Norton-on-Tees, England, assignor to Imperial Chemical Industries Ltd., a corporation of Great Britain No Drawing. Application March 11, 1931, Serial No. 521,885. In Great Britain March 31, 1930

12 Claims. (Cl. 71—9)

This invention relates to improved fertilizers and methods of manufacture thereof. It is well known that urea possesses valuable fertilizing properties and attempts have been made to bring it into a suitable form by granulation. It has also been suggested to mix urea with other fertilizing substances such as dicalcium phosphate.

I have now found that valuable mixed fertilizers possessing good storage properties are obtained by mixing together urea with water-insoluble ballast materials which may have fertilizing or other desirable properties, (such as rock phosphate, chalk, or gypsum), bringing the mixture into granular form.

According to my invention therefore there is produced a fertilizer in granular form comprising urea and water-insoluble ballast material such as rock phosphate, chalk, calcium sulphate (either as anhydrite or gypsum), with or without other water-soluble fertilizing constituents such as potassium salts, ammonium phosphate, etc. These fertilizers not only possess the valuable properties associated with urea by virtue of the ready availability of its nitrogen, but they are also especially valuable because of their greater stability, ease of handling and good storage properties, and the elasticity with which their nitrogen content can be adjusted over a very wide range from about 46 per cent. downward.

According to one form of the invention ground by-product chalk, limestone, or anhydrite is mixed with a hot concentrated solution or melt of urea and the mixture is subdivided into droplets which are caused to solidify by contact with cool gas, preferably in a tower; for example, the methods described in British Patent No. 309,299 may be suitably used. The droplets to be solidified should preferably be on the average at least 0.5 mm. in diameter, as smaller droplets lead to a less desirable product which contains a greater proportion of fines or dust which, unless removed, has a harmful effect upon the storage properties of the product. A suitable range of droplet size is 0.5 to 3 mm., larger droplets being difficult to produce in spherical shape owing to the tendency of the magma to form into stringy masses on subdivision, particularly when the magma is relatively viscous. Any of the usual disintegrating devices for liquids capable of producing droplets of the desired size may be employed for the subdivision, e.g. rotating discs, cones or cups in which the material is scattered from the periphery; also spraying devices of the nozzle type with or without an impinging air blast: also the vortex spraying device described in British Patent No. 345,658.

Satisfactory spraying of the material depends to a great extent upon the fluidity of the magma of raw materials, which in turn is dependent upon the temperature, the water content of the mixture and the proportion and nature of the solid matter suspended in the liquid. The general objects should be to obtain as high a degree of fluidity as possible consistent with the controlling factors mentioned below.

The temperature of the magma should be as high as possible consistent with avoidance of decomposition of urea, which in the presence of the ballast material (particularly calcium carbonate) is apt to occur at temperatures above 115° C., which temperature therefore should be regarded as an upper limit, although not necessarily a strict one, as a slight amount of decomposition may present little or no inconvenience. The water content of the magma may range from the minimum which is required to confer fluidity at the maximum working temperature, namely about 2.0 per cent. (calculated on the weight of dry solids) for a temperature of 110–115° C., to about 10 per cent: it is preferred to restrict the water content to the lower part of the said range, since when more water is present the droplets are not so readily solidified, e. g. a longer tower may be necessary, and also relatively soft granules are obtained as distinct from the hard granules obtained from magmas containing up to say 4 to 5 per cent. of water. Good results are obtained by working with a magma containing 4 per cent. of water relative to the solids, at a temperature of 95–100° C.

The proportion of ballast material to urea should not exceed 2 to 1 by weight, and preferably is less than 1.5 to 1, since with mixtures richer in ballast material the magma is not sufficiently fluid except at prohibitively high temperatures or in the presence of comparatively large amounts of water. Such mixtures therefore are more readily treated according to the alternative form of the invention set out below. The nature of the ballast material, particularly the degree of subdivision thereof, also plays an important part in relation to the fluidity of the magma: thus, if the material contains a substantial proportion of ultra-fine particles, the viscosity of the magma is greatly increased. For this reason, the ballast material should only be subdivided to such a degree as to permit a uniform granular product to be obtained and the presence of ultra-fine particles should be avoided as far as possible, e. g. by sifting or otherwise removing the said ultra-fines from the ground raw material.

The necessary concentrated solution or melt of urea may be prepared by evaporating dilute urea solution of any origin until the water content is reduced to the desired extent: alternatively, crude urea melts as obtained by heating ammonia and carbon dioxide or ammonium carbonate, e. g., to a temperature of 130–170° C. under pressure may be employed. The ground ballast material should be thoroughly mixed with the hot urea solution or melt and the magma thus formed maintained at a uniform temperature, e. g. 95–100° C. in a well stirred condition preparatory to its further treatment by subdivision into droplets.

Example 1.—110 parts of by product chalk from the manufacture of ammonium sulphate by double decomposition of calcium sulphate and ammonium carbonate were well mixed with 100 parts of a 93 per cent. solution of urea at a temperature of 95–100° C. and the resulting magma sprayed down a tower 80 feet high in still cool air. The granular product collected at the base was removed on a travelling band and passed to a rotary drier where residual moisture was removed by means of a stream of warm dry air. The product contained 21 per cent. available nitrogen, and consisted of approximately spherical granules which showed little or no tendency to cake on storage.

According to an alternative form of my invention a fertilizer comprising urea and water-insoluble ballast materials, with or without other water-soluble fertilizing constituents, is produced in granular form by stirring or agitating the ingredients in the presence of a limited quantity of water, with or without the simultaneous application of heat. Thus the ingredients of the fertilizer may be intimately mixed in the solid state and granulated by stirring of agitating while spraying with steam as in British Patent No. 349,007, or with water or a solution of urea or some other suitable fertilizer. When working in accordance with this form of the present invention, all of the ingredients should be finely ground.

Example 2.—44 parts by weight of dry urea and 56 parts of ground by-product chalk from the double decomposition of calcium sulphate and ammonium carbonate were fed into a granulator having an internal length of 10 feet and an internal diameter of 3 feet, provided with an axial agitator rotating at a speed of 65 R. P. M. About 3 tons of raw materials were fed in per hour and dry saturated steam was injected at the rate of 120 kg. per hour. The product was screened and afforded about 60 per cent. in the form of granules having a diameter between ½ and 3 mm. The material leaving the granulator had a temperature of 30–40° C. and a water content of about 4 per cent. The oversize granules were passed through a roll crusher and again screened, whereby the yields was brought to 75 per cent. All fines were recirculated to the granulation process.

Various changes may be made in the method described without departing from the invention or sacrificing any of the advantages thereof.

I claim:
1. Process of producing a fertilizer in granular form comprising urea and water-insoluble ballast material which consists in mixing the ballast material with a hot concentrated urea synthesis melt, subdividing the resultant magma into droplets and causing them to solidify by contact with cool gas.

2. Process as claimed in claim 1 in which the magma is sprayed down a tower.

3. Process as claimed in claim 1 in which the magma has a water content of 2–5 per cent. calculated on the weight of the total dry solids and is sprayed at a temperature between 95° C. and 115° C.

4. Process as claimed in claim 1 in which the ballast material is by-product chalk obtained in the double decomposition of calcium sulphate and ammonium carbonate.

5. A fertilizer comprising substantially equally homogeneous granules containing urea and calcium carbonate.

6. Process of producing a fertilizer in granular form comprising urea and calcium carbonate which comprises mixing the calcium carbonate with a hot concentrated solution of urea, subdividing the resultant magma into droplets and causing them to solidify by contact with cool gas.

7. Process of producing a fertilizer in granular form comprising urea and calcium carbonate which comprises mixing the calcium carbonate with a hot concentrated solution of urea, subdividing the resultant magma into droplets and causing them to solidify by spraying said magma down a tower.

8. Process of producing a fertilizer in granular form comprising urea and calcium carbonate which comprises mixing the calcium carbonate with a crude urea synthesis melt, subdividing the resultant magma into droplets and causing them to solidify by contact with cool gas.

9. Process for the production of a fertilizer in granular form which consists in mixing calcium carbonate with a hot concentrated solution of urea, the mixture containing 2–5% water (calculated on the total weight of dry solids), subdividing the magma into droplets, and solidifying the same by contact with cool gas.

10. Process of producing a fertilizer in granular form comprising urea and calcium carbonate which comprises mixing the calcium carbonate with a hot concentrated solution of urea, subdividing the magma into droplets of from 0.5 to 3 mm. diameter and causing them to solidify by contact with cool gas.

11. Process of producing a fertilizer which comprises subjecting urea and calcium carbonate, in finely divided form, to stirring or agitating in the presence of heat and water until substantial granulation of the mixture is obtained, and thereafter separating the granulated from the ungranulated product.

12. Process of producing a fertilizer which comprises subjecting urea and calcium carbonate, in finely divided form, to stirring or agitating in the presence of a limited quantity of steam until substantial granulation of the mixture is obtained, and thereafter separating the granulated from the ungranulated product.

WILLIAM KENNETH HALL.